(12) United States Patent
Jin

(10) Patent No.: US 11,465,480 B2
(45) Date of Patent: Oct. 11, 2022

(54) VEHICLE

(71) Applicant: Technologies' Xanadu of Resonatory-Solar-Systemed Co., Ltd., Beijing (CN)

(72) Inventor: Pu Jin, Beijing (CN)

(73) Assignee: Technologies' Xanadu of Resonatory-Solar-Systemed Co., Ltd.

( * ) Notice: Subject to any disclaimer, the term of this patent is extended or adjusted under 35 U.S.C. 154(b) by 451 days.

(21) Appl. No.: 16/305,972

(22) PCT Filed: Aug. 2, 2017

(86) PCT No.: PCT/CN2017/095697
§ 371 (c)(1),
(2) Date: Jun. 18, 2020

(87) PCT Pub. No.: WO2018/161499
PCT Pub. Date: Sep. 13, 2018

(65) Prior Publication Data
US 2020/0331533 A1    Oct. 22, 2020

(30) Foreign Application Priority Data
Mar. 6, 2017 (CN) .......................... 201710128114.8

(51) Int. Cl.
*B60K 1/00* (2006.01)
*B60K 1/04* (2019.01)
(Continued)

(52) U.S. Cl.
CPC .................. *B60K 1/04* (2013.01); *B60G 3/20* (2013.01); *B60K 1/02* (2013.01); *B60R 19/02* (2013.01);
(Continued)

(58) Field of Classification Search
CPC .......... B60K 1/04; B60K 1/02; B62D 23/005; B62D 27/065; B62D 63/025
(Continued)

(56) References Cited

U.S. PATENT DOCUMENTS

| 5,401,056 | A |   | 3/1995 | Eastman |            |
|-----------|---|---|--------|---------|------------|
| 5,882,064 | A | * | 3/1999 | Emmons  | B62D 23/005 |
|           |   |   |        |         | 296/193.04 |

(Continued)

FOREIGN PATENT DOCUMENTS

| CA | 2717163 A1 | 4/2012  |
|----|------------|---------|
| CN | 2647706 Y  | 10/2004 |

(Continued)

OTHER PUBLICATIONS

Japanese Office Action for Japanese Patent Application No. 2018-563570 drafted Dec. 12, 2019.
(Continued)

*Primary Examiner* — Hau V Phan
(74) *Attorney, Agent, or Firm* — Carlson, Gaskey & Olds, P.C.

(57) ABSTRACT

A vehicle is provided. The vehicle includes: a chassis including a chassis body and chassis modular units; at least one driving unit arranged in at least one of the chassis modular units, and configured to provide a driving force to at least a pair of wheels; and suspension systems. The chassis body is of an elongate shape in a first direction of the vehicle. A cockpit is arranged in the chassis body. The chassis modular units are connected to the chassis body in series in the first direction, and arranged at first and second ends of the chassis body in the first direction. Each chassis modular unit is connected to a corresponding pair of wheels through a corresponding suspension system.

19 Claims, 7 Drawing Sheets

(51) Int. Cl.
*B60G 3/20* (2006.01)
*B60K 1/02* (2006.01)
*B60R 19/02* (2006.01)
*B60R 21/13* (2006.01)
*B62D 23/00* (2006.01)
*B62D 27/06* (2006.01)
*B62D 63/02* (2006.01)

(52) U.S. Cl.
CPC ............ *B60R 21/13* (2013.01); *B62D 23/005* (2013.01); *B62D 27/065* (2013.01); *B62D 63/025* (2013.01)

(58) Field of Classification Search
USPC ........................................................ 180/297
See application file for complete search history.

(56) References Cited

U.S. PATENT DOCUMENTS

| | | | | |
|---|---|---|---|---|
| 7,281,600 B2* | 10/2007 | Chernoff | ............... | B62D 21/07 |
| | | | | 180/58 |
| 8,430,196 B2* | 4/2013 | Halliday | ................. | F41H 7/048 |
| | | | | 89/929 |
| 8,641,133 B1* | 2/2014 | Scaringe | .............. | B62D 29/008 |
| | | | | 296/193.03 |
| 9,045,014 B1* | 6/2015 | Verhoff | .................. | B60G 17/04 |
| 9,174,686 B1* | 11/2015 | Messina | ................. | B62D 33/04 |
| 9,409,471 B2* | 8/2016 | Hoppe | .................... | F41H 7/048 |
| 2010/0163330 A1* | 7/2010 | Halliday | ................. | F41H 7/044 |
| | | | | 180/295 |
| 2010/0319525 A1* | 12/2010 | Pavon | ..................... | F41H 5/007 |
| | | | | 89/902 |
| 2016/0137229 A1* | 5/2016 | Nishida | .................. | B62D 21/12 |
| | | | | 296/181.2 |
| 2017/0043680 A1* | 2/2017 | Ito | .......................... | B60R 21/13 |

FOREIGN PATENT DOCUMENTS

| | | |
|---|---|---|
| CN | 106672077 A | 5/2017 |
| CN | 206520655 U | 9/2017 |
| EP | 0142581 A1 | 5/1985 |
| JP | S6099156 U | 7/1985 |
| JP | H05147445 A | 6/1993 |
| JP | H05345511 A | 12/1993 |
| JP | 2000509345 A | 7/2000 |
| JP | 2006044400 A | 2/2006 |
| JP | 2017036019 A | 2/2017 |
| WO | 9741010 A1 | 11/1997 |
| WO | 2016051311 A1 | 4/2016 |

OTHER PUBLICATIONS

Extended European Search Report (EESR) for European Application No. 17899626.0 completed Dec. 11, 2019.

* cited by examiner

VEHICLE

CROSS-REFERENCE TO RELATED APPLICATIONS

The present application is a U.S. national phase application of PCT Application No. PCT/CN2017/095697 filed on Aug. 2, 2017, which claims a priority of a Chinese patent application No. 201710128114.8 filed on Mar. 6, 2017 in China, a disclosure of which is incorporated herein by reference in its entirety.

TECHNICAL FIELD

The present disclosure relates to a field of transportation, and in particular, relates to a vehicle.

BACKGROUND

Usually, a body of a vehicle may be a unitary construction body or a separate frame construction body. A vehicle having the separate frame construction body includes a rigid frame (also called a chassis frame) and a vehicle body mounted on the rigid frame. In the vehicle having the separate frame construction body, such assembly components as an engine, a part of a transmission system and the vehicle body are all fixed onto the rigid frame through suspension systems, and the rigid frame are connected to wheels by means of front and rear suspension systems. Although the separate frame construction body has excellent stationarity and safety, the vehicle having the separate frame construction body is cumbersome, heavy and relatively high. Therefore, the separate frame construction body is usually used in a truck, a bus or an off-load vehicle, and is also used in some limousines.

A vehicle having the unitary construction body does not include a rigid frame. The unitary construction body includes a bottom plate, a roof and pillars connected between the bottom plate and the roof. The pillars include pillars A located at a front side of front doors of the vehicle, pillars B located between the front doors and rear doors of the vehicle, and pillars C located at a rear side of the rear doors. The bottom plate, the roof and the pillars of the unitary construction body form an integral structure. The engine, the front suspension systems for mounting front wheels, the rear suspension systems for mounting rear wheels, and a part of the transmission system are all mounted on the unitary construction body. The vehicle having the unitary construction body has such advantages as small mass, small height and being easily assembled. Therefore, the unitary construction body is used in most cars.

Each of the bottom plate and the roof of the unitary construction body includes a body structural member and a body cover panel covering the body structural member. Most body cover panels and body structural members are manufactured through a stamping forming process, and a size and a shape of the unitary construction body are influenced by a size and a shape of each of the body structural member and the body cover panels. When a type of a vehicle having the unitary construction body needs to be changed, various stamping dies for manufacturing the body structural members and the body cover panels need to be changed. Thus, a cost for changing the type of the vehicle having the unitary construction body is huge.

SUMMARY

An object of the present disclosure is to provide a vehicle so as to solve a technical problem in the related art that a cost of changing types of vehicles is high.

According to one aspect of the embodiments of the present disclosure, a vehicle is provided in the present disclosure. The vehicle includes a chassis, at least one driving unit and a plurality of suspension systems. The chassis includes a chassis body and a plurality of chassis modular units. The at least one driving unit is arranged in at least one of the plurality of chassis modular units and configured to apply a driving force to at least one pair of wheels in wheels. A shape of the chassis body in a first direction of the vehicle is an elongate shape, a cockpit is arranged in the chassis body, and the plurality of chassis modular units is connected to the chassis body in series in the first direction of the vehicle and arranged at a first end and a second end of the chassis body in the first direction, and each of the plurality of chassis modular units is connected to a pair of wheels in the wheels corresponding to the chassis modular unit through one of the plurality of suspension systems corresponding to the chassis modular unit.

Optionally, the plurality of chassis modular units is detachably connected to the chassis body, each of the plurality of chassis modular units includes a housing configured to accommodate one driving unit of the at least one driving unit. Through holes are arranged in the housing, and are configured to allow a transmission device to pass through the through holes. The transmission device is configured to drive a pair of wheels in the wheels corresponding to the chassis modular unit to rotate. A first end of the transmission device away from the housing is connected to the pair of wheels corresponding to the chassis modular unit, and a second end of the transmission device away from the pair of wheels cooperates with the driving unit of the at least one driving unit, so as to enable the driving unit to drive the pair of wheels to rotate.

Optionally, connection components are arranged at both sides of each of the plurality of chassis modular units and detachably connected to one suspension system of the plurality of suspension systems for supporting a pair of wheels in the wheels corresponding to the suspension system, the suspension system extends away from the chassis modular unit in a direction perpendicular to the first direction, and ends of the suspension system away from the chassis modular unit are connected to the pair of wheels corresponding to the suspension system.

Optionally, each of the plurality of suspension systems includes a plurality of rods, a first end of each of the plurality of rods is connected to the chassis modular unit corresponding to the chassis modular unit, a second end of the each of the plurality of rods is connected to the pair of wheels corresponding to the suspension system, and at least one of the plurality of rods is inclined in the second direction relative to the vehicle.

Optionally, a plurality of first mounting portions is arranged on the housing, is configured to be connected to the first ends of the plurality of rods, respectively, and is arranged in a radial direction of the transmission device, and the first ends of the plurality of rods are connected to different ones of the plurality of first mounting portions so that inclination angles of the plurality of rods in the second direction are different.

Optionally, a plurality of second mounting portions is arranged on each of the wheels and is arranged in a radial direction of the wheel, and is connected to the second ends of the plurality of rods, respectively.

Optionally, the cockpit is arranged on a central line of the chassis body in the first direction, and a roll cage is arranged above the cockpit and detachably connected to the chassis.

Optionally, the roll cage includes two arch-shaped rod members, two oblique support rods, and a plurality of reinforcement rods connected between the two arch-shaped rod members. The two arch-shaped rod members are parallel to and spaced apart from each other, and two ends of each of the plurality of reinforcement rods are connected to the two arch-shaped rod members, respectively. A front end and a rear end of each of the two arch-shaped rod members are connected to the chassis body, the front end of the arch-shaped rod member is arranged in front of the cockpit, and the rear end of the arch-shaped rod member is arranged behind the cockpit. A first end of each of the two oblique support rods is connected to the chassis body, arranged in front of the cockpit, and spaced apart from the front end of one of the two arch-shaped rod members corresponding to the oblique support rod in the second direction, and a second end of the each of the two oblique support rods is connected to the one of the two arch-shaped rod members corresponding to the oblique support rod.

Optionally, the chassis further includes at least one passenger cabin. The at least one passenger cabin is located at least one of both sides of the chassis, arranged closer to a rear end of the chassis than the cockpit, and detachably connected to the chassis body.

Optionally, the vehicle further includes at least one third connection part configured to connect the chassis body with at least one the passenger cabin. The at least one third connection part includes a first plate body for connection with the chassis body, a second plate body for connection with one of the at least one passenger cabin, and a vertical plate for connecting the first plate body with the second plate body. The first plate body is connected to an upper end of the vertical plate, and the second plate body is connected to a lower end of the vertical plate, first bolt holes used for connection with the chassis body are arranged in the first plate body, and a bottom of the chassis body is connected with the first plate body through a plurality of first bolts passing through the first bolt holes. Second bolt holes used for connection with the passenger cabin are arranged in the second plate body, and a bottom of one of the at least one passenger cabin is connected with the second plate body through a plurality of second bolts passing through the second bolt holes.

Optionally, the plurality of chassis modular units includes a front chassis modular unit and a rear chassis modular unit, the wheels include a pair of front wheels and a pair of rear wheels, the at least one driving unit includes at least one of a front driving unit and a rear driving unit, and the plurality of suspension systems includes a front suspension system and a rear suspension system.

Optionally, at least one of the plurality of rods is telescopic.

Optionally, the vehicle further includes a plurality of buffer members arranged at the first end and the second end of the chassis body in the first direction, and configured to absorb impact forces applied to the first end and the second end.

Optionally, a power system cabin is further arranged in the chassis body, a power system is arranged within the power system cabin and configured to supply power to the at least one driving unit. The power system cabin is arranged behind the cockpit in the first direction, in front of one of the plurality of buffer members, and spaced apart from the cockpit, and is configured to accommodate the power system for supplying the power to the at least one driving unit.

Optionally, the power system includes at least one of a power generation system, a power storage system, a power transmission system and a power control system.

Optionally, the at least one driving unit includes an electric motor, the first direction is a longitudinal direction of the vehicle, and the second direction is a lateral direction of the vehicle.

Optionally, the plurality of first mounting portions is arranged on the connection component.

Optionally, the plurality of first mounting portions is arranged on the housing.

Optionally, a support structure for supporting one of the at least one driving unit is further arranged on the housing.

Optionally, each of the connection components is located outside, and connected to, one of the at least one driving unit in the second direction.

By applying the technical solution, the chassis includes a plurality of independent components, e.g., the chassis body and chassis modular units connected to both ends of the chassis body. When the vehicles with different wheelbases need to be manufactured, one or more of the components of the chassis need to be changed and be connected in series so as to provide the chassis with different wheelbases. As a result, a massive production of different types of vehicles may be manufactured easily through the chassis, thereby reducing the cost of changing vehicle types.

BRIEF DESCRIPTION OF THE DRAWINGS

In order to illustrate technical solutions of the present disclosure or related art more clearly, drawings used in description of the present disclosure or the related art will be described hereinafter briefly. Obviously, the drawings merely represent some embodiments of the present disclosure. One skilled in the art may obtain other drawings Based on these drawings without paying any creative effort.

Figure 1:
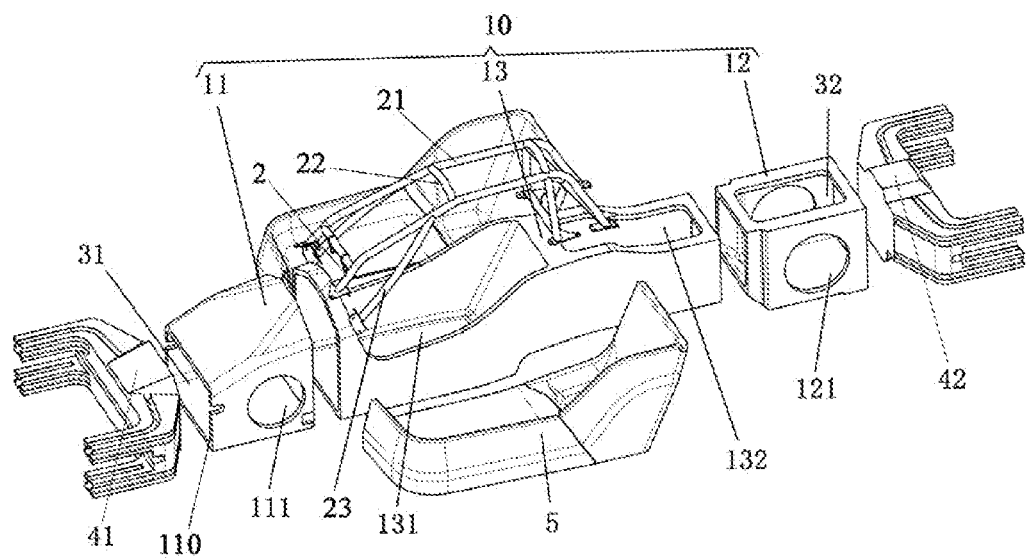
FIG. 1 shows an exploded view of a frame of a vehicle according to some embodiments of the present disclosure.

REFERENCE SIGN LIST 1 vehicle
10 chassis
11 front chassis modular unit
110 first housing
111 first through hole
112 first connection component
115 first mounting portion
12 rear chassis modular unit
121 second through hole
122 second housing
123 support structure
124 second connection component
125 third mounting portion
13 chassis body
131 cockpit
1310 side wall
132 power system cabin
2 roll cage
21 arch-shaped rod member
22 reinforcement rod
23 oblique support rod
31 first engine compartment
32 second engine compartment
33 front driving unit
331 first electric motor
34 rear driving unit
341 second electric motor
41 front buffer member
42 rear buffer member
5 passenger cabin
61 first transmission device
610 first transmission shaft
62 second transmission device
620 second transmission shaft
71 front suspension system
711 first rod
72 rear suspension system
721 second rod
73 front wheel
731 second mounting portion
74 rear wheel
741 fourth mounting portion
8 connection part
81 first plate body
811 first bolt hole
82 second plate body
821 second bolt hole
83 vertical plate

DETAILED DESCRIPTION

Technical solutions of embodiments of the present disclosure will be described hereinafter clearly and completely in conjunction with drawings of the embodiments of the present disclosure. Obviously, the described embodiments are merely a part, rather than all, of the embodiments of the present disclosure. Description to at least one exemplary embodiment hereinafter is only illustrative, but do not limit the present disclosure. All other embodiments obtained by one skilled in the art based on the embodiments of the present disclosure without any creative labor fall within the scope of the present disclosure.

In the present disclosure, a phrase such as "a plurality of elements" or "multiple elements" refers to two or more elements. A phrase "longitudinal direction" of a vehicle refers to a lengthwise direction of the vehicle, a phrase "lateral direction" of the vehicle refers to a widthwise direction of the vehicle, a term "front" refers to a direction following a head direction of the vehicle, and a term "rear" refers to a direction following a tail direction of the vehicle.

Figure 2:
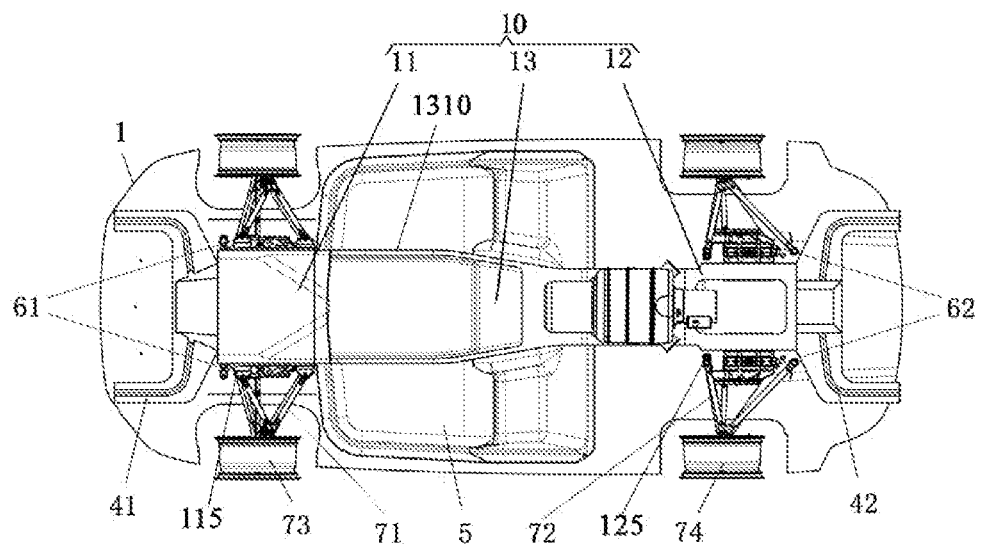
FIG. 2 shows a structural schematic view of the vehicle according to some embodiments of the present disclosure.
Figure 3:
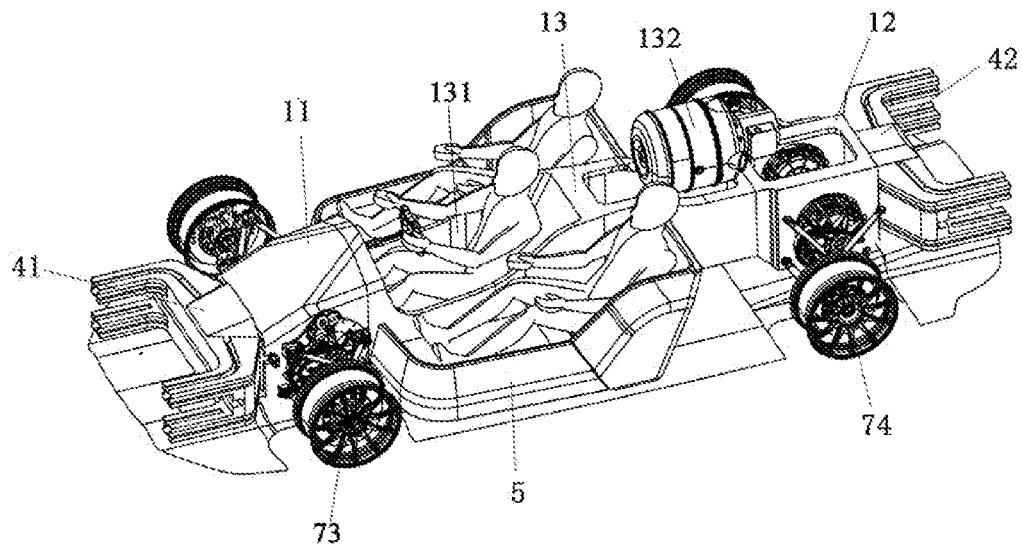
FIG. 3 shows a stereoscopic view of the vehicle according to some embodiments of the present disclosure.

FIG. 1 is an exploded view of a frame of a vehicle according to some embodiments of the present disclosure. FIG. 2 is a structural schematic diagram of the vehicle according to some embodiments of the present disclosure. FIG. 3 is a stereoscopic view of the vehicle according to some embodiments of the present disclosure.

Referring to FIG. 1, FIG. 2 and FIG. 3, the vehicle 1 includes a chassis 10 and a driving unit. The driving unit is arranged on the chassis 10 and configured to provide a driving force to wheels. The chassis 10 includes a chassis body 13, a front chassis modular unit 11 connected to a front end of the chassis body 13, and a rear chassis modular unit 12 connected to a rear end of the chassis body 13. A shape of the chassis body 13 in a longitudinal direction of the vehicle 1 is an elongate shape, e.g., a linear shape.

The front chassis modular unit 11 is connected to a pair of front wheels 73 through a front suspension system 71, and the rear chassis modular unit 12 is connected to a pair of rear wheels 74 through a rear suspension system 72.

One or two of the front chassis modular unit 11 and the rear chassis modular unit 12 are provided with a driving unit. If the front chassis modular unit 11 is provided with the driving unit, the vehicle 1 may be a front-wheel-drive vehicle. If the rear chassis modular unit 12 is provided with the driving unit, the vehicle 1 may be a rear-wheel-drive vehicle. If each of the front chassis modular unit 11 and the rear chassis modular unit 12 is provided with the driving unit, the vehicle 1 may be a four-wheel-drive vehicle. The vehicle 1 shown in some embodiments of the present disclosure may be the four-wheel-drive vehicle. In such a case, the driving unit arranged in the front chassis modular unit 11 may be called as a front driving unit 33, and the driving unit arranged in the rear chassis modular unit 12 may be called as a rear driving unit 34.

According to some embodiments of the present disclosure, the chassis 10 includes the chassis body 13 and a plurality of independent components including the front chassis modular unit 11 and the rear chassis modular unit 12 connected to the front end and the rear end of the chassis body 13. When vehicles with different wheelbases need to be manufactured, only one or more of the plurality of components of the chassis 10 need to be changed and connected sequentially to provide the chassis 10 with different wheelbases. In addition, a tread and a ground clearance of the vehicle may be changed by modifying a length of a suspension rocker-arm and a height of the suspension system on the chassis modular unit. As a result, a massive production of different types of vehicles may be achieved by using the chassis 10 of some embodiments of the present disclosure, and a cost for changing vehicle types is reduced.

Figure 8:
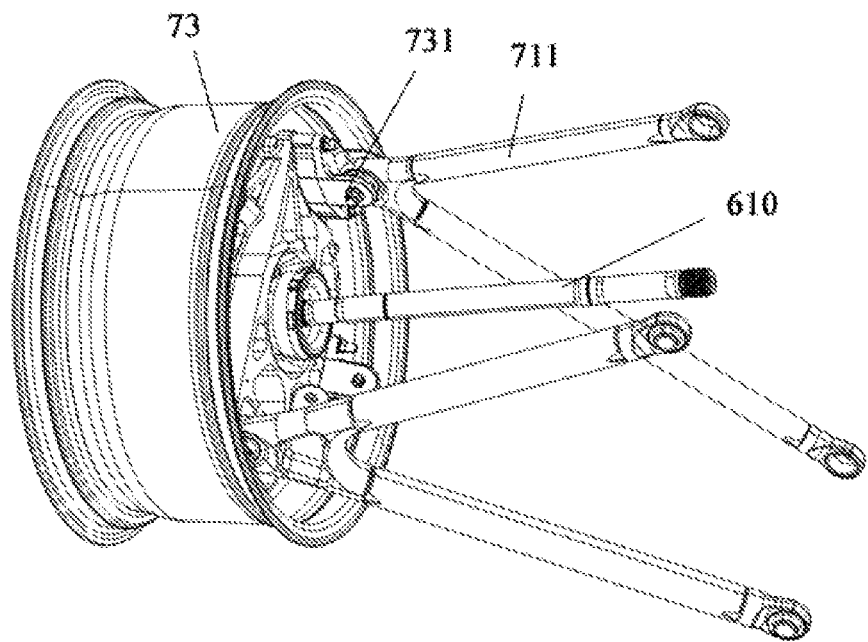
FIG. 8 shows a schematic view of a front wheel and a front suspension system of the vehicle according to some embodiments of the present disclosure.

The front chassis modular unit 11 includes a first housing 110. First through holes 111 are arranged in the first housing 110, and are configured to allow a first transmission device 61 to pass through the first through holes. The first transmission device 61 is configured to drive the pair of front wheels 73 to rotate. The first transmission device 61 extends from an interior of the first housing 110 to an exterior of the first housing 110 in a lateral direction of the vehicle. Ends of the first transmission device 61 away from the first housing 110 are connected to the pair of front wheels 73. As shown in FIG. 8, the first transmission device 61 includes a first transmission shaft 610.

A first engine compartment 31 may be arranged inside the first housing 110 and be configured to accommodate the front driving unit 33 for driving the pair of front wheels 73. A support structure for supporting the front driving unit 33 may be further arranged on the first housing 110.

Figure 9:
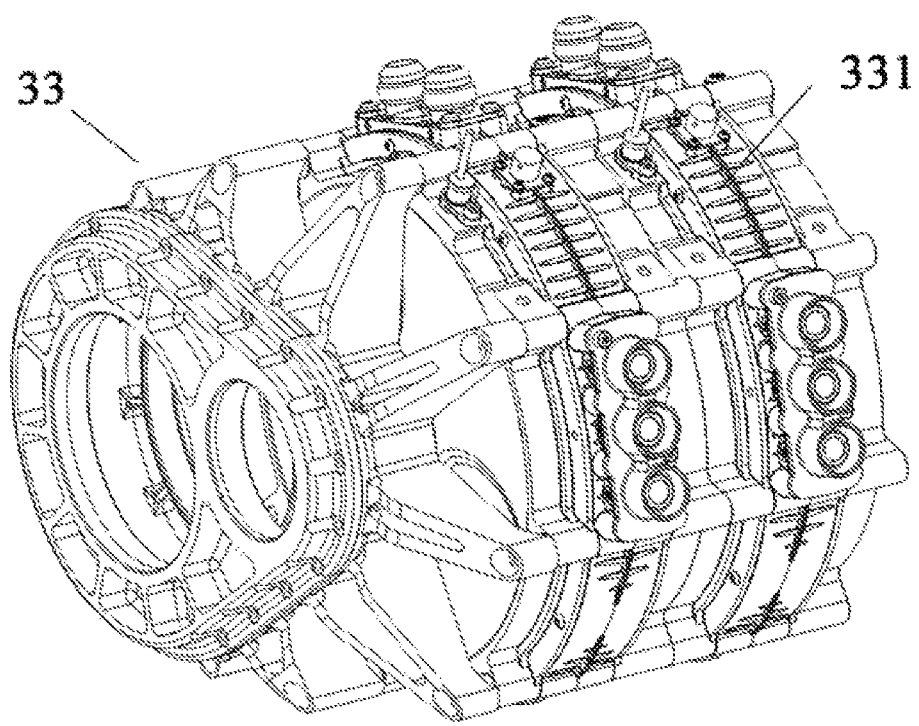
FIG. 9 shows a schematic view of an external structure of a front driving unit of the vehicle according to some embodiments of the present disclosure.

FIG. 9 shows an external structure of the front driving unit 33 according to some embodiments of the present disclosure. The front driving unit 33 includes a first engine 331. Ends of the first transmission device 61 away from the pair of front wheels 73 cooperate with the front driving unit 33 in a transmissible manner so that the front driving unit 33 may drive the pair of front wheels 73 to rotate.

Optionally, a retarder, a differential mechanism and a gearbox (not shown) may be further arranged between the front driving unit 33 and the first transmission device 61.

Figure 11:
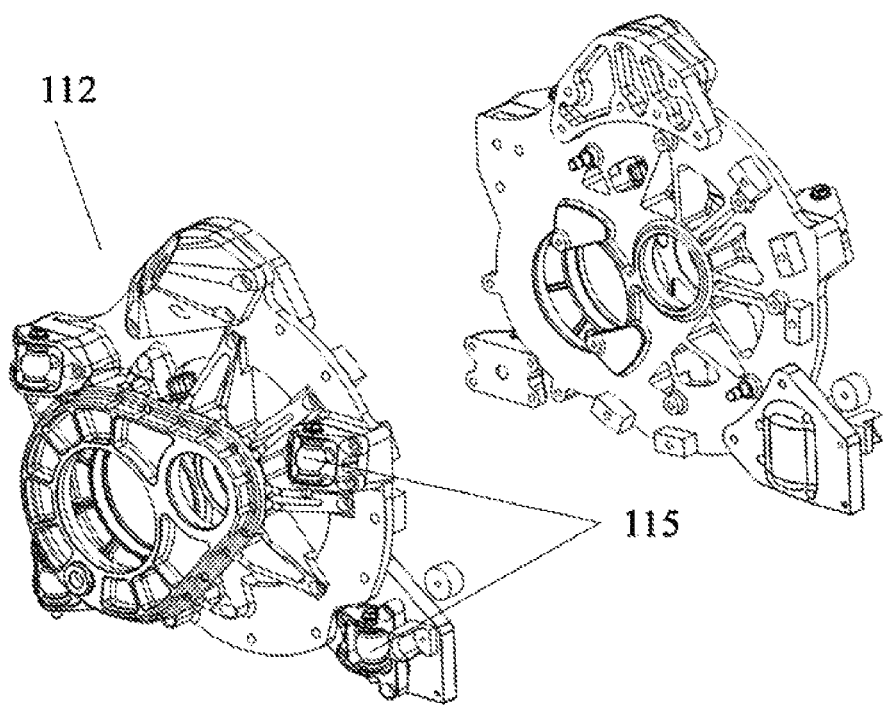
FIG. 11 shows a schematic view of a first connection component arranged outside the front driving unit according to some embodiments of the present disclosure.

In some embodiments of the present disclosure, a first connection component 112 is arranged at either side of the front chassis modular unit 11 and is detachably connected to a front suspension system 71 for supporting either of the pair of front wheels 73. As shown in FIG. 11, the first connection component 112 is arranged on a side surface of the front chassis modular unit 11. The front suspension system 71 is connected to the first connection component 112, and extends away from the front chassis modular unit 11 in the lateral direction of the vehicle 1. Ends of the front suspension system 71 away from the front chassis modular unit 11 are connected to the pair of front wheels 73.

FIG. 8 shows a schematic diagram of a front wheel and a front suspension system of the vehicle according to some embodiments of the present disclosure. As shown in FIG. 8, the front suspension system 71 includes a plurality of first rods 711. A first end of each of the plurality of first rods 711 is connected to the first connection component 112 of the front chassis modular unit 11, and a second end of the each of the plurality of first rods 711 is connected to one of the pair of front wheels 73. At least a part of the plurality of first rods 711 are inclined relative to the lateral direction of the vehicle, so as to form a triangular stabilization structure.

A plurality of mounting portions 115 may be arranged on the first connection component 112. The plurality of mounting portions 115 is arranged in a radial direction of the first transmission device 61. First ends of the plurality of first rods 711 may be connected to different ones of the plurality of mounting portions 115, respectively so that the plurality of first rods 711 is inclined with different inclination angles relative to the lateral direction of the vehicle 1. In this way, vertical distances between second ends of the plurality of first rods 711 and the front chassis modular unit 11 are different, and thereby a length of the front suspension system 71 may be adjusted. Therefore, a distance between the pair of front wheels 73 may be adjusted.

Optionally, a plurality of second mounting portions 731 may be arranged on each of the pair of front wheels 73. The plurality of second mounting portions 731 is arranged in a radial direction of either of the front wheel 73 and may be configured to be connected to the second ends of the first rods 711, respectively. The second ends of the first rods 711 may be connected to different ones of the plurality of second mounting portions 731 so that inclination angles of the first rods 711 relative to the lateral direction of the vehicle 1 may be adjusted. In this way, the length of the front suspension system 71 and the distance between the pair of front wheels 73 may be adjusted.

Similarly, by adjusting mounting positions of both ends of each of the first rods 711 relative to the front chassis modular unit 11 and the front wheel 73, the ground clearance of the front chassis modular unit 11 may also be adjusted.

In this way, the length of the front suspension system of the vehicle in some embodiments of the present disclosure is adjustable so as to change the tread of the vehicle. Further, the ground clearance of the front chassis modular unit 11 of the vehicle 1 is also adjustable so as to change the ground distance of the vehicle 1. Hence, vehicles with different ground distances and different treads may be manufactured by simply adjusting the chassis 10 and the front suspension system 71 of the vehicle 1.

Of course, the chassis 10 of the vehicle may further cooperate with different front suspension systems 71 and different rear suspension systems 72, so as to change a width, the tread, and the ground clearance of the vehicle.

As shown in FIGS. 1 and 3, a height of a top surface of the first housing 110 of the front chassis modular unit 11 increases gradually from a foreside to a rear side, and the top surface of the first housing 110 smoothly transitions to a top surface of the chassis body 13, so as to provide the vehicle with a streamline shape. Optionally, the top surface of the first housing 110 smoothly transitions to a side surface of the first housing 110.

In some embodiments of the present disclosure, components of the chassis 10, such as the front chassis modular unit 11, the chassis body 13 and the rear chassis modular unit 12, may be made of an aluminum alloy. Two adjacent ones of the components of the chassis 10 may be connected to each other through a welding process, rivets or bolts.

In addition, the components of the chassis 10 may also be made of carbon fibers, and two adjacent ones of the components may be connected to each other through an adhesive or rivets. Optionally, one of the two adjacent components may be made of carbon fibers, the other of the two adjacent components may be made of an aluminum alloy, and the two adjacent components made of different materials may be connected to each other through the adhesive or rivets.

A cockpit 131 is arranged in the chassis body 13, and a width of the chassis body 13 is slightly greater than a width of the cockpit 131. A casing of the chassis body 13 includes two side walls 1310 spaced apart from each other in the lateral direction of the vehicle, and the cockpit 131 is formed between the two side walls 1310.

A power system cabin 132 is further arranged in the chassis body 13 and configured to accommodate a power system or any other components of the vehicle. The power system is configured to supply power to the driving units of the vehicle. In some embodiments of the present disclosure, the power system includes a power generation system, a power storage system (e.g., an accumulator), a power transmission system and/or a power control system. The power system cabin 132 is located behind the cockpit 131, and spaced apart from the cockpit 131 by a specific distance. Hence, by changing a distance between the power system cabin 132 and the cockpit 131, the length of the chassis body 13 may be changed, and thereby, the wheelbase of the vehicle may be changed.

Figure 4:
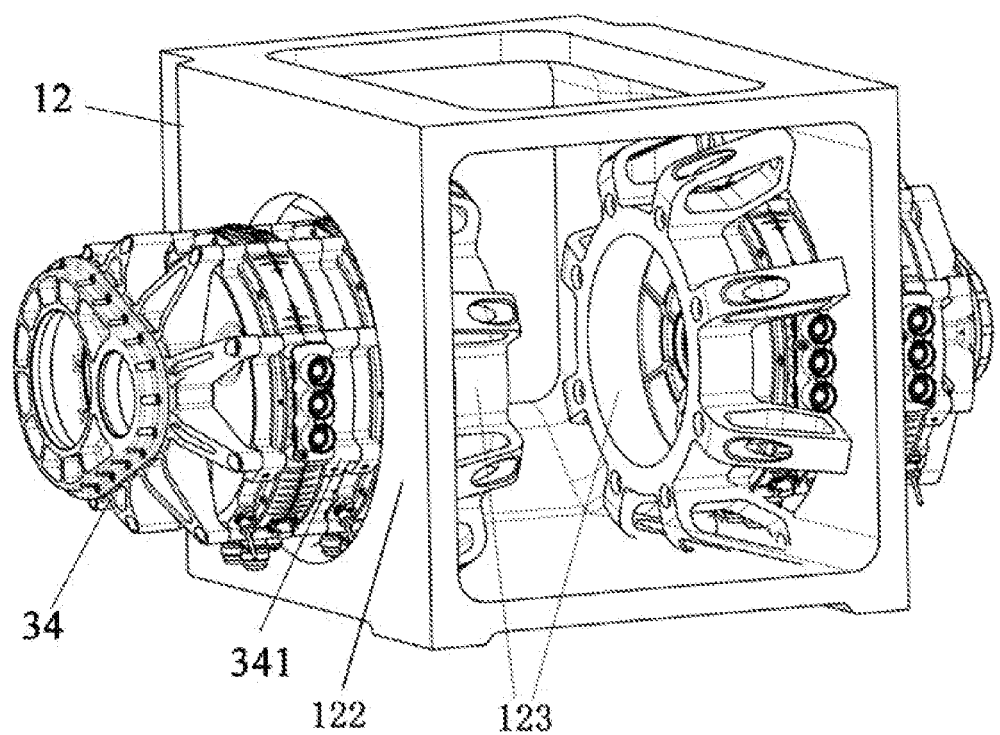
FIG. 4 shows a structural schematic view of a rear chassis modular unit of a chassis of the vehicle according to some embodiments of the present disclosure.
Figure 10:
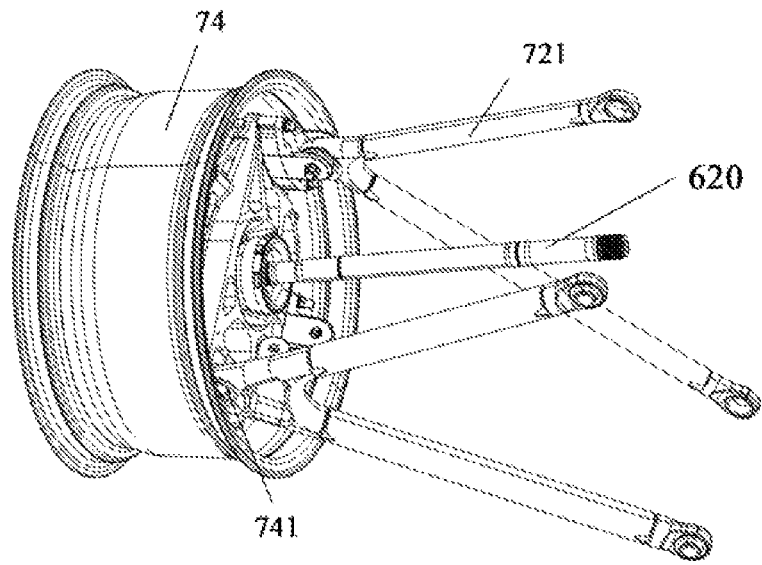
FIG. 10 shows a schematic view of a rear wheel and a rear suspension system of the vehicle according to some embodiments of the present disclosure.

FIG. 3 is a stereoscopic diagram of the structure of the vehicle according to some embodiments of the present disclosure. FIG. 4 is a structural schematic view of the rear chassis modular unit 12 according to some embodiments of the present disclosure. As shown in FIGS. 1, 3 and 4, the rear chassis modular unit 12 includes a second housing 122. Second through holes 121 are arranged in the second housing 122, and are configured to allow a second transmission device 62 to pass through the second through holes. The second transmission device 62 is configured to drive a pair of rear wheels 74 to rotate. The second transmission device 62 extends from an interior of the second housing 122 to an exterior of the second housing 122 in the lateral direction of the vehicle. Ends of the second transmission device 62 away from the second housing 122 are connected to the pair of rear wheels 74 of the vehicle 1. As shown in FIG. 10, the second transmission device 62 includes a second transmission shaft 620.

The second housing 122 includes a second engine compartment 32 configured to accommodate a rear driving unit 34 for driving the pair of rear wheels 74. The rear driving unit 34 is arranged inside the second housing 122. A support structure 123 for supporting the rear driving unit 34 is further arranged in the second housing 122.

In some embodiments of the present disclosure, the rear driving unit 34 includes a second electric motor 341. Ends of the second transmission device 62 away from the pair of rear wheels 74 cooperate with the rear driving unit 34 in a transmissible manner, so that the rear driving unit 34 may drive the pair of rear wheels 74 to rotate.

Optionally, a retarder, a differential mechanism and a gearbox (not shown) may also be arranged between the rear driving unit 34 and the second transmission device 62.

Figure 12:
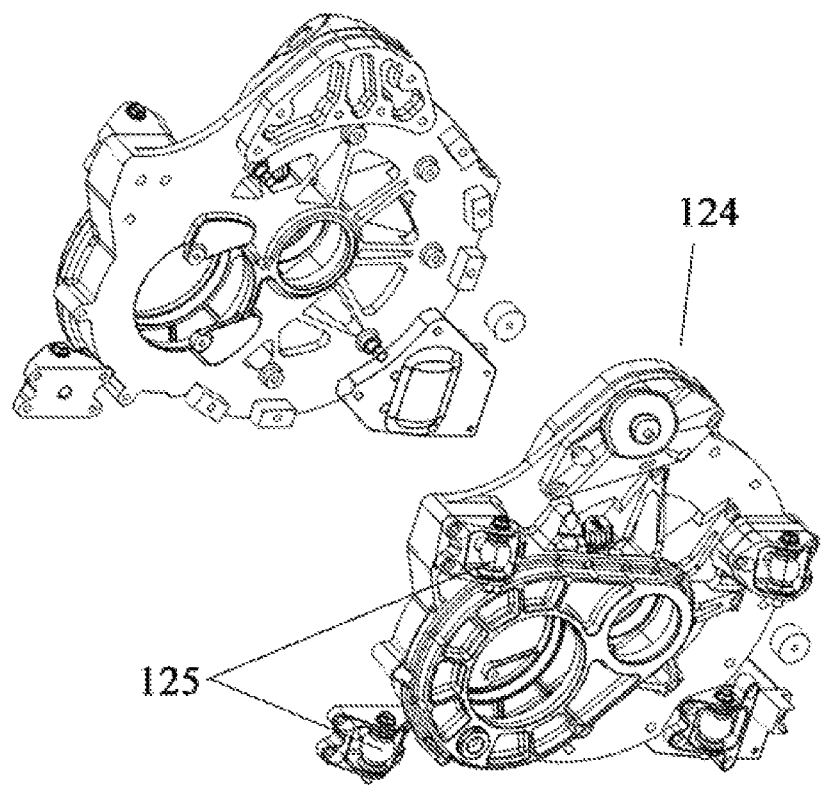
FIG. 12 shows a structural schematic view of a second connection component arranged outside a rear driving unit according to some embodiments of the present disclosure.

FIG. 12 shows a structural schematic diagram of second connection components arranged outside the rear driving unit according to some embodiments of the present disclosure. The second connection components 124 are arranged outside the rear driving unit 34 and are arranged at both sides of the rear chassis modular unit 12. Each of the second connection components 124 includes a plurality of third mounting portions 125. The plurality of third mounting portions 125 may be detachably connected to the rear suspension system 72 for supporting the pair of rear wheels 74. Ends of the rear suspension system 72 adjacent to the rear chassis modular unit 12 are connected to the second connection component 124, and extends away from the rear chassis modular unit 12 in the lateral direction of the vehicle 1. Other ends of the rear suspension system 72 away from the rear chassis modular unit 12 are connected to the pair of rear wheels 74.

The rear suspension system 72 includes a plurality of second rods 721. First ends of the second rods 721 are connected to the plurality of third mounting portions 125 on the second connection component 124, and second ends of the second rods 721 are connected to the rear wheel 74. At least a part of the second rods 721 are inclined relative to the lateral direction of the vehicle 1, so as to form a triangular stabilization structure.

Optionally, the plurality of third mounting portions 125 connected to the first ends of the second rods 721 may be arranged on the second housing 122 and may be arranged in the radial direction of the second transmission device 62. The first ends of the second rods 721 may be connected to different third mounting portions 125, so that inclination angles of the second rods 721 relative to the lateral direction of the vehicle 1 are different, and thereby, vertical distances between the second ends of the second rods 721 and the rear chassis modular unit 12 are different. In this way, a length of the rear suspension system 72 may be adjusted, and thereby, a distance between the pair of rear wheels 74 may be adjusted.

Optionally, a plurality of fourth mounting portions 741 may be arranged on either of the pair of rear wheels 74 and is configured to be connected to the second ends of the plurality of second rods 721. The plurality of fourth mounting portions 741 is arranged in a radial direction of either of the pair of rear wheels 74. The second ends of the second rods 721 are connected to different ones of the fourth mounting portions 741, so that the inclination angles of the second rods 721 relative to the lateral direction of the vehicle 1 may be adjusted, and thereby, the length of the rear suspension system 72 and the distance between the pair of rear wheels 74 may be adjusted.

Similarly, by adjusting mounting positions of both ends of each of the second rods 721 relative to the rear chassis modular unit 12 and the rear wheel 74, a ground clearance of the rear chassis modular unit 12 may also be adjusted.

Thus, the length of the rear suspension system 72 of the vehicle in some embodiments of the present disclosure is adjustable so as to change the tread of the vehicle. Further, a ground clearance of the chassis 10 of the vehicle is also adjustable, so as to change the ground distance of the vehicle. Hence, vehicles with different ground distances and different treads may be manufactured by simply adjusting the chassis 10 and the rear suspension system 72 of the vehicle.

In a word, the lengths of the suspension systems of vehicle in some embodiments of the present disclosure are adjustable, so as to change the tread of the vehicle.

The chassis 10 of the vehicle may cooperate with different front suspension systems 71 and different rear suspension systems 72, so as to change the width, the tread, and the ground clearance of the vehicle.

Optionally, the rods of at least one of the front suspension system 71 or the rear suspension system 72 are telescopic, so that the length of at least one of the front suspension system 71 or the rear suspension system 72 may be adjusted.

Figure 5:
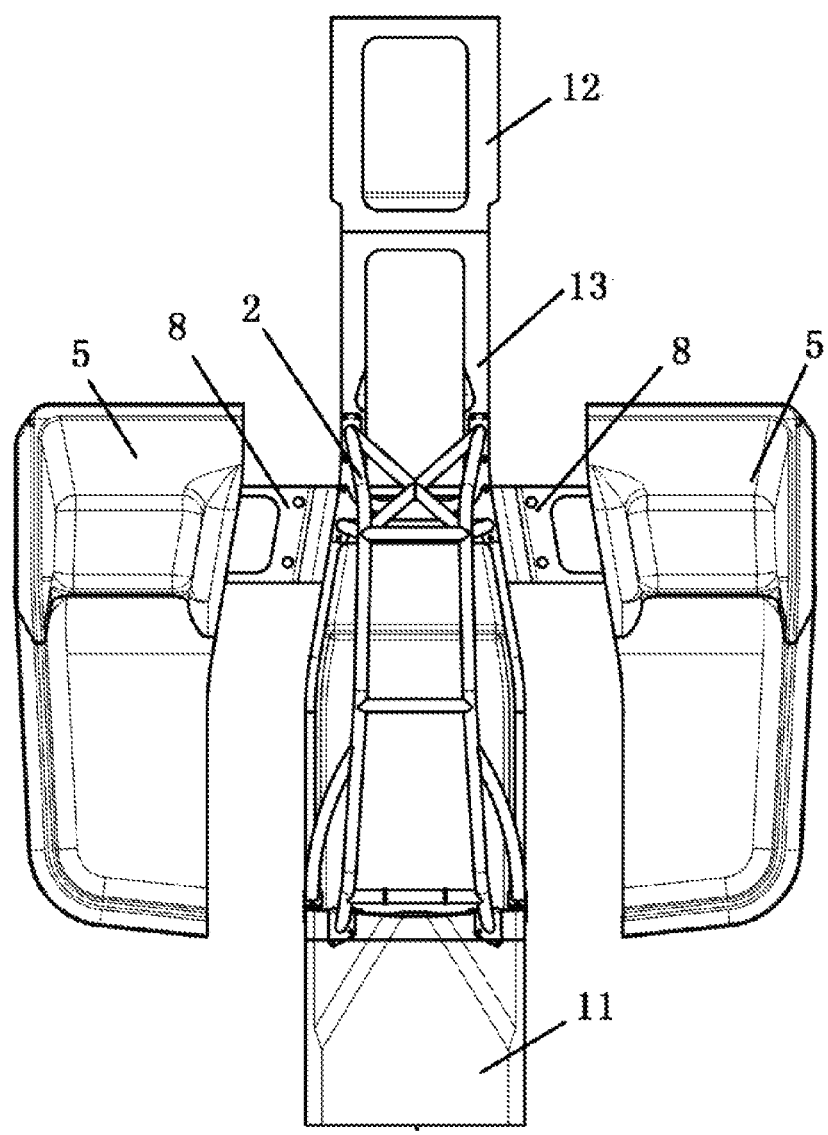
FIG. 5 shows a structural schematic view where the chassis is not connected to passenger cabins according to some embodiments of the present disclosure.
Figure 7:
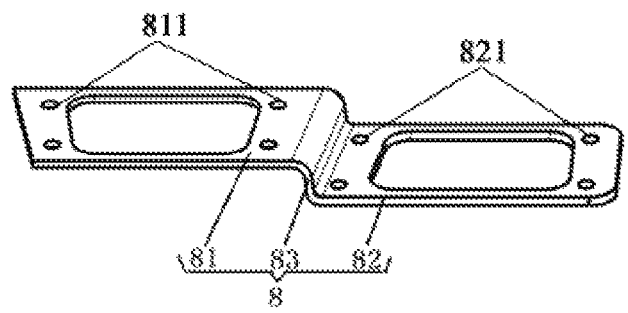
FIG. 7 shows a structural schematic view of a connection component for connecting the chassis and the passenger cabin of the vehicle according to some embodiments of the present disclosure.

As shown in FIGS. 1, 5 and 7, the cockpit 131 is a chamber formed by the casing of the chassis body 13, and an upper portion of the cockpit 131 is opened.

In order to prevent the vehicle from rolling over when the vehicle is running, the chassis may further include a roll cage 2 arranged above the cockpit 131 and detachably connected to the chassis body 13. The roll cage 2 may effectively protect a driver and a passenger from being injured when an accident occurs.

The roll cage 2 includes two arch-shaped rod members 21 parallel to and spaced apart from each other, and a plurality of reinforcement rods 22 connected between the two arch-shaped rod members 21. Two ends of each of the reinforcement rods 22 are connected to the two arch-shaped rod members 21 respectively.

A front end and a rear end of each of the arch-shaped rod member 21 are connected to the chassis body 13. The front end of the arch-shaped rod member 21 is located in front of the cockpit 131, and the rear end of the arch-shaped rod member 21 is located behind the cockpit 131.

The roll cage 2 further includes two oblique support rods 23. A first end of each of the oblique support rods 23 is connected to the chassis body 13, located in front of the cockpit 131, and spaced apart from the front end of one of the arch-shaped rod member 21 corresponding to the oblique support rod in the lateral direction of the vehicle. A second end of each of the oblique support rod 23 is connected to one of the arch-shaped rod member 21 corresponding to the oblique support rod, so as to reinforce a structural strength of the roll cage 2.

The chassis 10 further includes a passenger cabin 5 arranged at a side of the chassis body 13 and detachably connected to the chassis body 13.

The passenger cabin 5 may be merely arranged at one side of the chassis 10, or two passenger cabins 5 may be arranged at both sides of the chassis 10. In addition, the passenger cabin may also be designed as a luggage cabin.

In some embodiments of the present disclosure, the passenger cabins 5 are arranged at both sides of the cockpit 131. The cockpit 131 is arranged in the middle in the lateral direction of the vehicle, and the two passenger cabins 5 arranged at both sides of the cockpit 131 are symmetric relative to the chassis body 13.

In some embodiments of the present disclosure, the passenger cabins 5 are arranged at both sides of the chassis 10 and to be closer to the rear end of the chassis 10 than the cockpit 131, so as to prevent a viewing field of a driver from being shielded by the passenger cabins.

Figure 6:
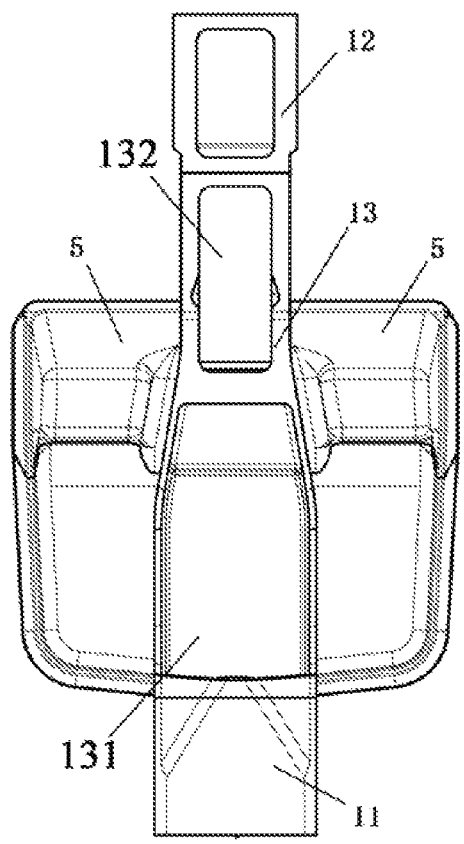
FIG. 6 is a structural schematic view where the chassis is connected to the passenger cabins according to some embodiments of the present disclosure.

FIG. 5 shows a structural schematic view where the chassis body 13 of the chassis 10 is not connected to the passenger cabin 5 according to some embodiments of the present disclosure. FIG. 6 shows a structural schematic diagram where the chassis body 13 of the chassis 10 is connected to the passenger cabins 5.

In some embodiments of the present disclosure, both of the chassis body 13 and the passenger cabins 5 may be made of aluminum alloy, and may be connected to each other through rivets, the welding process or bolts.

Optionally, one of the chassis body 13 and the passenger cabins 5 may be made of aluminum alloy, and the other of the chassis body 13 and the passenger cabins may be made of carbon fibers; or both of the chassis body 13 and the passenger cabins 5 may be made of carbon fibers. The chassis body 13 and the passenger cabins 5 may be connected to each other through an adhesive or rivets.

Optionally, the chassis 10 may further include connection parts 8 for connecting the chassis body 13 with the passenger cabins 5.

FIG. 7 shows a structural schematic diagram of the connection part 8 for connecting the chassis body 13 of the chassis and the passenger cabins 5 according to some embodiments of the present disclosure. As shown in FIG. 7, the connection part 8 includes a first plate body 81 for connection with the chassis 10, a second plate body 82 for connection with the passenger cabin 5, and a vertical plate 83 connecting the first plate body 81 with the second plate body 82. The first plate body 81 is connected to an upper end of the vertical plate 83, and the second plate body 82 is connected to a lower end of the vertical plate 83.

First bolt holes 811 are arranged in the first plate body 81 and are used for connection with the chassis 10. The first plate body 81 may be connected to the bottom of the chassis body 10 through a plurality of first bolts. Second bolt holes 821 are arranged in the second plate body 82 and are used for connection with one of the passenger cabins 5. The second plate body 82 is connected to the bottom of the passenger cabin 5 through a plurality of second bolts.

In some embodiments of the present disclosure, the vehicle 1 further includes a front buffer member 41 connected to a front end of the chassis 10 and a rear buffer member 42 connected to a rear end of the chassis 10, so as to protect the vehicle and the driver and passengers inside the vehicle when an accidental collision occurs.

The above embodiments are illustrative embodiments of the present disclosure only. The present disclosure is not limited thereto. Any modification, substitution, or improvement made within the spirit and the principle of the present disclosure falls within the scope of the present disclosure.

What is claimed is:

1. A vehicle, comprising:
 a chassis comprising a chassis body and a plurality of chassis modular units;
 at least one driving unit arranged in at least one of the plurality of chassis modular units and configured to apply a driving force to at least one pair of wheels in wheels;
 a plurality of suspension systems,
 wherein a shape of the chassis body in a first direction of the vehicle is an elongate shape,
 a cockpit is arranged in the chassis body, and the plurality of chassis modular units is connected to the chassis body in series in the first direction of the vehicle and arranged at a first end and a second end of the chassis body in the first direction,
 each of the plurality of chassis modular units is connected to a pair of wheels in the wheels corresponding to the chassis modular unit through one of the plurality of suspension systems corresponding to the chassis modular unit;
 wherein the plurality of chassis modular units is detachably connected to the chassis body, each of the plurality of chassis modular units comprises a housing configured to accommodate one driving unit of the at least one driving unit;
 through holes are arranged in the housing, the through holes are configured to allow a transmission device to pass through, the transmission device is configured to drive a pair of wheels in the wheels corresponding to the chassis modular unit to rotate; and
 a first end of the transmission device away from the housing is connected to the pair of wheels corresponding to the chassis modular unit, and a second end of the transmission device away from the pair of wheels cooperates with the driving unit of the at least one driving unit, so as to enable the driving unit to drive the pair of wheels to rotate.

2. The vehicle according to claim 1, wherein connection components are arranged at both sides of each of the plurality of chassis modular units and detachably connected to one suspension system of the plurality of suspension systems for supporting a pair of wheels in the wheels corresponding to the suspension system, the suspension system extends away from the chassis modular unit in a direction perpendicular to the first direction, and ends of the suspension system away from the chassis modular unit are connected to the pair of wheels corresponding to the suspension system.

3. The vehicle according to claim 2, wherein each of the plurality of suspension systems comprises a plurality of rods, a first end of each of the plurality of rods is connected to the chassis modular unit corresponding to the chassis modular unit, a second end of the each of the plurality of rods is connected to the pair of wheels corresponding to the suspension system, and at least one of the plurality of rods is inclined in a second direction relative to the vehicle.

4. The vehicle according to claim 3, wherein a plurality of first mounting portions is arranged on the housing, is configured to be connected to the first ends of the plurality of rods, respectively, and is arranged in a radial direction of the transmission device, and the first ends of the plurality of rods are connected to different ones of the plurality of first mounting portions so that inclination angles of the plurality of rods in the second direction are different.

5. The vehicle according to claim 4, wherein the plurality of first mounting portions is arranged on the connection components.

6. The vehicle according to claim 4, wherein the plurality of first mounting portions is arranged on the housing.

7. The vehicle according to claim 3, wherein a plurality of second mounting portions is arranged on each of the wheels and is arranged in a radial direction of the wheel, and is connected to the second ends of the plurality of rods, respectively.

8. The vehicle according to claim 3, wherein the cockpit is arranged on a central line of the chassis body in the first direction, and a roll cage is arranged above the cockpit and detachably connected to the chassis.

9. The vehicle according to claim 8, wherein the roll cage comprises two arch-shaped rod members, two oblique support rods and a plurality of reinforcement rods connected between the two arch-shaped rod members, the two arch-shaped rod members are parallel to and spaced apart from each other, and two ends of each of the plurality of reinforcement rods are connected to the two arch-shaped rod members, respectively;
a front end and a rear end of each of the two arch-shaped rod members are connected to the chassis body, the front end of the arch-shaped rod member is arranged in front of the cockpit, and the rear end of the arch-shaped rod member is arranged behind the cockpit; and
a first end of each of the two oblique support rods is connected to the chassis body, arranged in front of the cockpit, and spaced apart from the front end of one of the two arch-shaped rod members corresponding to the oblique support rod in the second direction, and a second end of the each of the two oblique support rods is connected to the one of the two arch-shaped rod members corresponding to the oblique support rod.

10. The vehicle according to claim 3, wherein at least one of the plurality of rods is telescopic.

11. The vehicle according to claim 3, wherein the at least one driving unit comprises an electric motor, the first direction is a longitudinal direction of the vehicle, and the second direction is a lateral direction of the vehicle.

12. The vehicle according to claim 3, wherein each of the connection components is located outside, and connected to, one of the at least one driving unit in the second direction.

13. The vehicle according to claim 1, wherein the chassis further comprises at least one passenger cabin, the at least one passenger cabin is located at least one of both sides of the chassis, arranged closer to a rear end of the chassis than the cockpit, and detachably connected to the chassis body.

14. The vehicle according to claim 13, further comprising:
at least one third connection part configured to connect the chassis body with at least one the passenger cabin, wherein the at least one third connection part comprises a first plate body for connection with the chassis body, a second plate body for connection with one of the at least one passenger cabin, and a vertical plate for connecting the first plate body with the second plate body,
the first plate body is connected to an upper end of the vertical plate, and the second plate body is connected to a lower end of the vertical plate,
first bolt holes used for connection with the chassis body are arranged in the first plate body, and a bottom of the chassis body is connected with the first plate body through a plurality of first bolts passing through the first bolt holes, and
second bolt holes used for connection with the one of the at least one passenger cabin are arranged in the second plate body, and a bottom of one of the at least one passenger cabin is connected with the second plate body through a plurality of second bolts passing through the second bolt holes.

15. The vehicle according to claim 1, wherein the plurality of chassis modular units comprises a front chassis modular unit and a rear chassis modular unit, the wheels comprise a pair of front wheels and a pair of rear wheels, the at least one driving unit comprises at least one of a front driving unit and a rear driving unit, and the plurality of suspension systems comprises a front suspension system and a rear suspension system.

16. The vehicle according to claim 1, further comprising:
a plurality of buffer members arranged at the first end and the second end of the chassis body in the first direction, and configured to absorb impact forces applied to the first end and the second end.

17. The vehicle according to claim 16, wherein a power system cabin is further arranged in the chassis body, a power system is arranged within the power system cabin and configured to supply power to the at least one driving unit,
the power system cabin is arranged behind the cockpit in the first direction, in front of one of the plurality of buffer members, and spaced apart from the cockpit, and is configured to accommodate the power system for supplying the power to the at least one driving unit.

18. The vehicle according to claim 17, wherein the power system comprises at least one of a power generation system, a power storage system, a power transmission system and a power control system.

19. The vehicle according to claim 1, wherein a support structure for supporting one of the at least one driving unit is further arranged on the housing.

* * * * *